United States Patent
Tilton (10) Patent No.: US 10,957,019 B1
(45) Date of Patent: Mar. 23, 2021

(54) SYSTEM AND METHOD FOR ELIMINATING PROCESSING WINDOW ARTIFACTS BY UTILIZING PROCESSING WINDOW OVERLAP IN TWO AND THREE DIMENSIONAL HIERARCHICAL AND RECURSIVE HIERARCHICAL IMAGE SEGMENTATION PROCESSING

(71) Applicant: UNITED STATES OF AMERICA AS REPRESENTED BY THE ADMINISTRATOR OF NASA, Washington, DC (US)

(72) Inventor: James C. Tilton, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 49 days.

(21) Appl. No.: 16/534,660

(22) Filed: Aug. 7, 2019

(51) Int. Cl.
  *G06K 9/00* (2006.01)
  *G06T 5/00* (2006.01)
  (Continued)

(52) U.S. Cl.
  CPC .............. *G06T 5/001* (2013.01); *G06T 5/40* (2013.01); *G06T 7/11* (2017.01); *G06T 15/08* (2013.01);
  (Continued)

(58) Field of Classification Search
  CPC ............. G06T 7/11; G06T 2207/20016; G06T 2207/20021; G06T 7/187;
  (Continued)

(56) References Cited

U.S. PATENT DOCUMENTS 5,048,095 A * 9/1991 Bhanu .................... G06T 7/143
  382/173
7,697,759 B2 * 4/2010 Tilton .................... G06T 7/174
  382/180

(Continued)

OTHER PUBLICATIONS

J. C. Tilton, "Analysis of hierarchically related image segmentations," IEEE Workshop on Advances in Techniques for Analysis of Remotely Sensed Data, 2003, Greenbelt, MD, USA, 2003, pp. 60-69, doi: 10.1109/WARSD.2003.1295173. (Year: 2003).*

(Continued)

*Primary Examiner* — Li Liu
(74) *Attorney, Agent, or Firm* — Christopher O. Edwards; Bryan A. Geurts; Helen M. Galus (57) ABSTRACT

A method includes receiving a recursively subdivided and reassembled first image comprising pixels, each pixel assigned a region label, subdividing the image into overlapping subsections, determining overlapping pixels surrounding seams along which the overlapping subsections are joined together, accumulating a histogram of co-occurrences of region label pairs of the overlapping pixels surrounding the seams along which the overlapping subsections are joined together, merging overlapping pixels having region labels with a co-occurrence histogram count exceeding a predetermined threshold, and merging spatially and non-spatially adjacent regions of the first image to form a second image with reduced artifacts proximate the seams along which the overlapping subsections are joined together.

20 Claims, 4 Drawing Sheets (51) Int. Cl.
*G06T 7/11* (2017.01)
*G06T 15/08* (2011.01)
*G06T 5/40* (2006.01)

(52) U.S. Cl.
CPC ............. *G06T 2207/20021* (2013.01); *G06T 2207/20221* (2013.01)

(58) Field of Classification Search
CPC ........ G06T 2207/10032; G06K 9/0063; G06K 9/342; G06K 9/34
See application file for complete search history.

(56) References Cited

U.S. PATENT DOCUMENTS

| 8,526,733 | B2* | 9/2013 | Tilton | ................... | G06T 7/11 |
| | | | | | 382/173 |
| 2008/0301211 | A1* | 12/2008 | Tilton | ................... | G06T 7/187 |
| | | | | | 708/322 |
| 2015/0355353 | A1* | 12/2015 | Whitaker | ............... | G01V 1/345 |
| | | | | | 702/14 |
| 2019/0158011 | A1* | 5/2019 | West | ..................... | G01J 1/4214 |

OTHER PUBLICATIONS

J. C. Tilton, "Image segmentation by region growing and spectral clustering with a natural convergence criterion," IGARSS '98. Sensing and Managing the Environment. Symposium Proceedings, pp. 1766-1768 (Year: 1998).*

Chen, Qiu-Xiao, et al. "A hybrid multi-scale segmentation approach for remotely sensed imagery." IGARSS 2003. 2003 IEEE International Geoscience and Remote Sensing Symposium. Proceedings (IEEE Cat. No. 03CH37477). vol. 6. IEEE, 2003. (Year: 2003).*

Summa, Brian, Julien Tierny, and Valerio Pascucci. "Panorama weaving: fast and flexible seam processing." ACM Transactions on Graphics (TOG) 31.4 (2012): 1-11. (Year: 2012).*

* cited by examiner

SYSTEM AND METHOD FOR ELIMINATING PROCESSING WINDOW ARTIFACTS BY UTILIZING PROCESSING WINDOW OVERLAP IN TWO AND THREE DIMENSIONAL HIERARCHICAL AND RECURSIVE HIERARCHICAL IMAGE SEGMENTATION PROCESSING

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefor.

BACKGROUND

Image segmentation is the partitioning of an image into related sections or regions. For remotely sensed images of the earth, an example of an image segmentation would be a labeled map that divides the image into areas covered by distinct earth surface covers such as water, snow, types of natural vegetation, types of rock formations, types of agricultural crops and types of other man created development. In unsupervised image segmentation, the labeled map may consist of generic labels such as region 1, region 2, etc., which may be converted to meaningful labels by a post-segmentation analysis.

Segmentation is a key first step for a number of approaches to image analysis and compression. In image analysis, the group of image points contained in each region provides a good statistical sampling of image values for more reliable labeling based on region mean feature values. In addition, the region shape can be analyzed for additional clues to the appropriate labeling of the region. In image compression, the regions form a basis for compact representation of the image. The quality of the prerequisite image segmentation is a key factor in determining the level of performance for these image analysis and compression approaches.

A segmentation hierarchy is a set of several image segmentations of the same image at different levels of detail in which the segmentations at coarser levels of detail can be produced from simple merges of regions at finer levels of detail. This is useful for applications that require different levels of image segmentation detail depending on the particular image objects segmented. A unique feature of a segmentation hierarchy that distinguishes it from most other multilevel representations is that the segment or region boundaries are maintained at the full image spatial resolution for all levels of the segmentation hierarchy.

In a segmentation hierarchy, an object of interest may be represented by multiple image segments in finer levels of detail in the segmentation hierarchy, and may be merged into a surrounding region at coarser levels of detail in the segmentation hierarchy. If the segmentation hierarchy has sufficient resolution, the object of interest will be represented as a single region segment at some intermediate level of segmentation detail. The segmentation hierarchy may be analyzed to identify the hierarchical level at which the object of interest is represented by a single region segment. The object may then be identified through its spectral and spatial characteristics. Additional clues for object identification may be obtained from the behavior of the image segmentations at the hierarchical segmentation levels above and below the level at which the object of interest is represented by a single region. Segmentation hierarchies may be formed through a region growing approach to image segmentation. In region growing, spatially adjacent regions iteratively merge through a specified merge selection process.

Hierarchical Step-Wise Optimization (HSWO) is a form of region growing segmentation that directly forms a segmentation hierarchy. HSWO is an iterative process, in which the iterations consist of finding the best segmentation with one region less than the current segmentation. The HSWO approach can be summarized as follows:

1. Initialize the segmentation by assigning each image pixel a region label. If a presegmentation is provided, label each image pixel according to the presegmentation. Otherwise, label each image pixel as a separate region.
2. Calculate the dissimilarity criterion value between all pairs of spatially adjacent regions, find the pair of spatially adjacent regions with the smallest dissimilarity criterion value, and merge that pair of regions.
3. Stop if no more merges are required. Otherwise, return to step 2.

HSWO naturally produces a segmentation hierarchy consisting of the entire sequence of segmentations from initialization down to the final trivial one region segmentation (if allowed to proceed that far). For practical applications, however, a subset of segmentations needs to be selected out from this exhaustive segmentation hierarchy.

A Hierarchical Segmentation (HSeg) algorithm was developed as a tool for producing high quality segmentations of Earth remote sensing image data. The key characteristics of HSeg are (i) the high spatial fidelity of the image segmentations, (ii) HSeg's automatic grouping of sets of spatially connected region objects into region classes, and (iii) HSeg's automatic production of a hierarchical set of image segmentations.

The key unique aspect of the HSeg algorithm is its tight integration of region growing segmentation, which produces spatially connected region objects, with region object classification, which groups sets of region objects together into region classes. No other practical operational image segmentation approach has this tight integration of region growing object finding with region classification.

However, this tight integration of region growing object finding and region classification causes HSeg to be computationally intensive. A recursive, divide-and-conquer, approximation of HSeg, called RHSeg (Recursive HSeg), was devised to help overcome these computational difficulties. A parallel computing platform implementation of RHSeg is disclosed in U.S. Pat. No. 6,895,115, issued on May 17, 2005. In the RHSeg algorithm, the image is recursively subdivided into subsections until the subsections are small enough to be processed by HSeg in a reasonable amount of time. Once the smallest subsections are processed by HSeg, HSeg is restarted at the level of recursion with the next larger subsections after being initialized with the results from the smaller subsections. This process of restarting HSeg on larger and larger portions of the image is continued until HSeg processes the entire image as a single entity.

The previously described two spatial dimension formulation and implementation of RHSeg has been extended to three spatial dimensions. It has been noted that there is a great need for the analysis of data with three spatial dimensions, in particular the need is most pressing in medical image analysis for the analysis of three dimensional scans of various areas of the human body. For example, analyses of two dimensional (2D) scans of the colon produce numerous false positives in the detection of polyps in virtual colonoscopies. This is because normal folds in the colon often look like colon polyps in two dimensional views. However, three dimensional (3D) analyses of the data would easily detect differences between normal folds in the colon and colon polyps. 3D analyses offer similar advantages to the analysis of other medical imagery data such as MRI brain scans and 3D mammograms. 3D analyses also offer advantages in other fields such a nondestructive testing and the analysis of ground penetrating radar data.

A key problem encountered with both 2D and 3D versions of RHSeg is that the image segmentation results often exhibit artifacts caused by the recursive subdivision of the image. These processing window artifacts manifest themselves as region boundaries that line up along the processing window seams, even in cases when pixels along the region boundaries may have similar characteristics. An early approach to eliminating these processing window artifacts was the subject of U.S. Pat. No. 7,697,759 (issued 13 Apr. 2010). This current application supersedes this previous patent.

This current application provides an improved method for processing window artifact elimination that applies to both the 2D and 3D versions of RHSeg, and also includes all the improvements in computational processing efficiency presented in U.S. Pat. No. 8,526,733 (issued 3 Sep. 2013).

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed embodiments are directed to eliminating processing window artifacts in both the 2D and 3D versions of RHSeg.

In at least one aspect, the disclosed embodiments are directed to a method including receiving a recursively subdivided and reassembled first image comprising pixels, each pixel assigned a region label, subdividing the image into overlapping subsections, determining overlapping pixels surrounding seams along which the overlapping subsections are joined together, accumulating a histogram of co-occurrences of region label pairs of the overlapping pixels surrounding the seams along which the overlapping subsections are joined together, merging overlapping pixels having region labels with a co-occurrence histogram count exceeding a predetermined threshold, and merging spatially and non-spatially adjacent regions of the first image to form a second image with reduced artifacts proximate the seams along which the overlapping subsections are joined together.

The overlapping pixels may surround the seams, along which the overlapping subsections are joined together, in two dimensions The overlapping pixels may form a 4 pixel wide area of pixels along vertical and horizontal seams along which the image subsections are joined together The overlapping pixels may surround the seams, along which the overlapping subsections are joined together, in a three dimensional volume.

The three dimensional volume may be 4 pixels by a total number of rows and slices surrounding a vertical seam, 4 pixels by a total number of slices and columns surrounding a horizontal seam, and 4 pixels by a total number of columns and rows surrounding a depth seam, along which seams the image subsections are joined together.

The predetermined threshold of the co-occurrence histogram count may be 9.

The method may further include eliminating double counted pixels before merging spatially and non-spatially adjacent regions of the first image.

In another aspect, the disclosed embodiment are directed to a system including a processor, and a memory storing instructions for controlling the processor to receive a recursively subdivided and reassembled first image comprising pixels, each pixel assigned a region label, subdivide the image into overlapping subsections, determine overlapping pixels surrounding seams along which the overlapping subsections are joined together, accumulate a histogram of co-occurrences of region label pairs of the overlapping pixels surrounding the seams along which the overlapping subsections are joined together, and merge overlapping pixels having region labels with a co-occurrence histogram count exceeding a predetermined threshold to form a second image with reduced artifacts proximate the seams along which the overlapping subsections are joined together.

In yet another aspect, the disclosed embodiments are directed to a non-transitory computer readable medium, storing computer executable program code, which when executed by at least one processor of a computer system, causes the computer system to receive a recursively subdivided and reassembled first image comprising pixels, each pixel assigned a region label, subdivide the image into overlapping subsections, determine overlapping pixels surrounding seams along which the overlapping subsections are joined together, accumulate a histogram of co-occurrences of region label pairs of the overlapping pixels surrounding the seams along which the overlapping subsections are joined together, and merge overlapping pixels having region labels with a co-occurrence histogram count exceeding a predetermined threshold to form a second image with reduced artifacts proximate the seams along which the overlapping subsections are joined together.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Although the disclosed embodiments will be described with reference to the embodiments shown in the drawings and described below, it should be understood that these could be embodied in many alternate forms. In addition, any suitable size, shape or type of elements or materials could be used.

Figure 1:
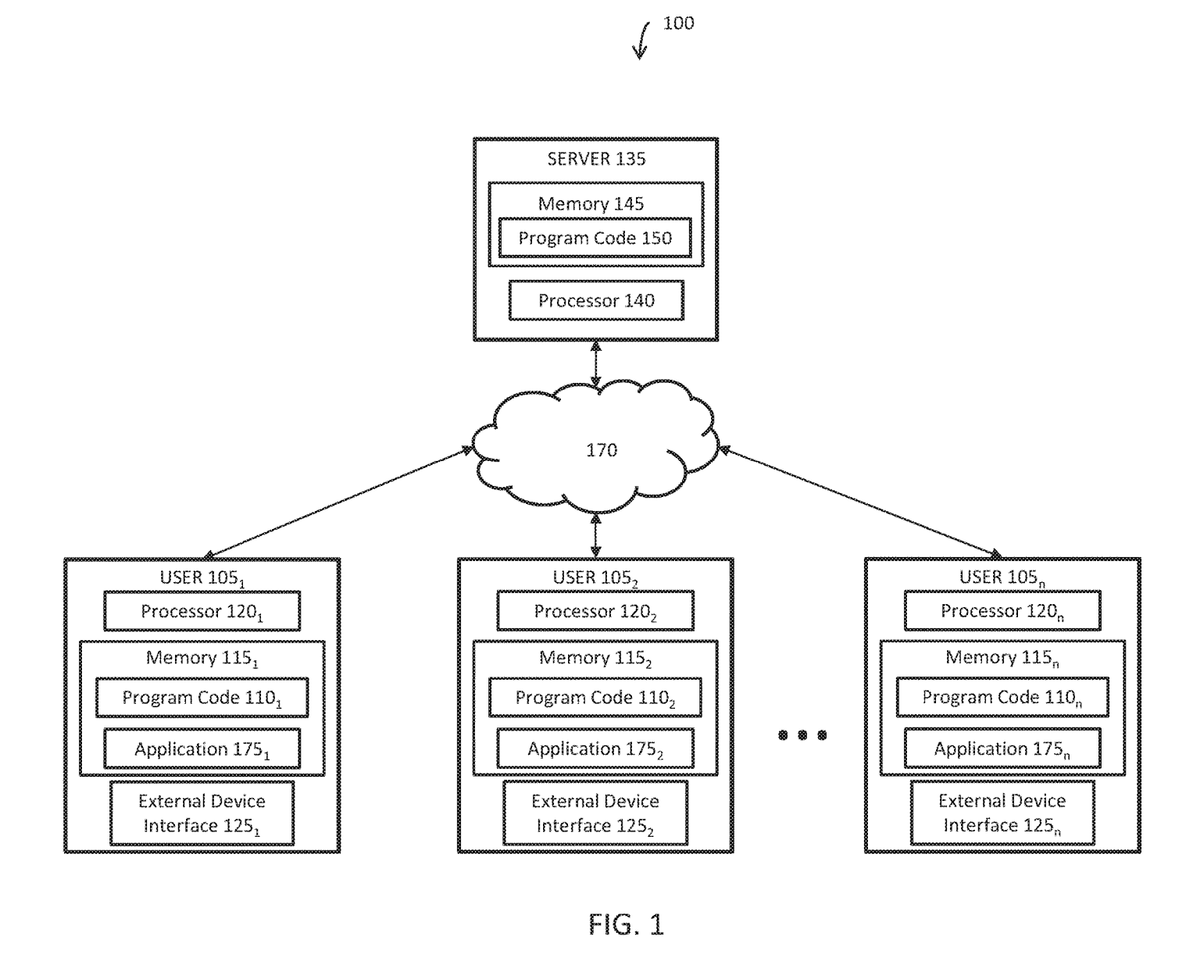
FIG. 1 shows a schematic illustration of an exemplary computing system for practicing the disclosed embodiments.

FIG. 1 shows a schematic illustration of an exemplary computing system 100 for practicing the disclosed embodiments. The system 100 may include one or more user terminals $105_1$-$105_n$. Each user terminal $105_1$-$105_n$ may include computer readable program code $110_1$-$110_n$ stored on at least one non-transitory computer readable medium for carrying out and executing the processes described herein, including eliminating processing window artifacts in the 3D version of RHSeg. The computer readable medium may include memories $115_1$-$115_n$, and in alternate aspects, the computer readable program code $110_1$-$110_n$ may be stored in memories external to, or remote from, user terminals $105_1$-$105_n$. Memories $115_1$-$115_n$ may include magnetic media, semiconductor media, optical media, or any media which is readable and executable by a computer. Each user terminal $105_1$-$105_n$ may also include a processor $120_1$-$120_n$ for executing the computer readable program code $110_1$-$110_n$ in a sequential processing configuration. In some embodiments, each user terminal $105_1$-$105_n$ may include multiple processors $120_1$-$120_n$ for executing the computer readable program code $110_1$-$110_n$ in a parallel processing configuration.

At least one embodiment may be limited to a single autonomous user terminal 105, while other embodiments may include multiple user terminals $105_1$-$105_n$. In some embodiments, one or more of the user terminals $105_1$-$105_n$ may be connected to each other and optionally to a server 135 through a network 170. The computer readable program code $110_1$-$110_n$ of one or more of the user terminals may invoke or operate an application $175_1$-$175_n$ for accessing other user terminals and the server 135.

The server 135 may include a processor 140, and memory 145 storing computer program code 150 for generally operating the server 135 to provide the computing system operations described herein. In some embodiments, the at least one server 135 may be implemented by a cloud computing service, and the processes described herein, including eliminating processing window artifacts in the 3D version of RHSeg, may be provided in the form of software as a service (SaaS).

Figure 2:
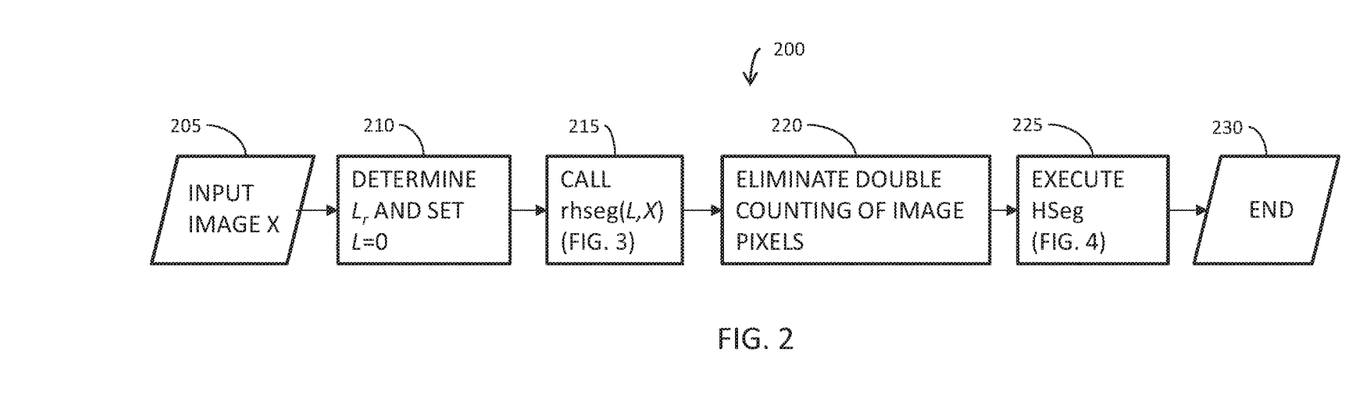
FIG. 2 illustrates a flow diagram of the operations of the RHSeg algorithm, according to the disclosed embodiments.

Referring to FIG. 2, an improved version of the RHSeg algorithm 200 is presented that is suitable for operating on the exemplary computing system 100. The improved version of the RHSeg algorithm 200 may recursively subdivide the image data, X, into smaller sub-sections by calling a recursive function, rhseg(L,X), as shown in block 215, and may then apply HSeg, as shown in block 225, to the smaller sub-sections of data. As mentioned above, a key problem encountered with RHSeg is that the image segmentation results often exhibit artifacts caused by the recursive subdivision of the image. These processing window artifacts manifest themselves as region boundaries that align along the processing window seams.

An approach to reduce the processing window artifacts for 2D images may include blending results together from the smaller subsections based on slightly overlapping processing windows and matching up the segmentation results in the overlapped areas. The disclosed embodiments are directed to adapting this approach for 3D images. An overall description of the RHSeg algorithm is provided in order to clearly describe the disclosed embodiments.

FIG. 2 illustrates a flow diagram of the RHSeg algorithm 200. The algorithm includes determining a number of times to subdivide the image X 210, calling recursive function rhseg(L,X) 215, eliminating double counting of image pixels as part of artifact elimination 220, and execution of the HSeg algorithm 225.

The image X is input to the algorithm, as shown in block 205. As shown in block 210, the number of times $L_r$ that RHSeg subdivides the image X may be determined. The determination may be determined from, for example, the size of the image data and the maximum desired size for the image subsection processed at the deepest level of recursion by the recursive function rhseg(L,X), called in block 215. In some embodiments, a default the subimage size may be set to ≤1,048,576 (≅101×101×101) pixels in 3D for sequential processing and ≤32,768 (=32×32×32) pixels in 3D for parallel processing. For example, for a 3D image with 256 columns, 224 rows and 192 slices, the image may be subdivided into eight subsections (the number of dimensions: $N_D=3$, $2^{N_D}=8$) of 128 columns, 112 rows and 96 slices (1,376,256 pixels), and then each subsection may be further subdivided into eight subsections of 64 columns, 56 rows and 48 slices (172,032 pixels). For computing configurations using sequential processing, the subdivision may stop, making $L_r=2$. For parallel processing, an additional level of subdivision may be performed, making $L_r=3$, where each subsection may be further subdivided into eight subsections of 32 columns, 28 rows and 24 slices (21,504 pixels). The RHSeg algorithm 200 may then call the recursive function rhseg(L,X).

Figure 3:
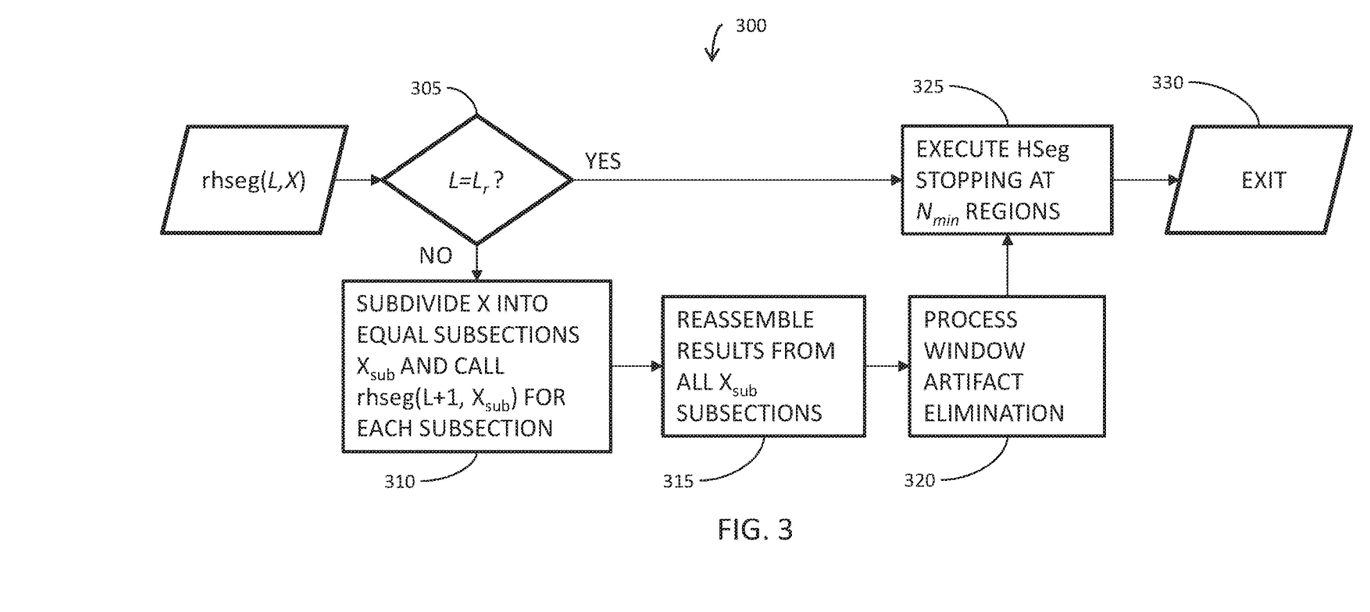
FIG. 3 depicts a flow diagram of the operations of a recursive function rhseg(L,X) according to the disclosed embodiments.

FIG. 3 illustrates a flow diagram of the recursive function rhseg(L,X). The recursive function rhseg(L,X) may generally operate to recursively subdivide the image X into subsections small enough to be processed by HSeg in a reasonable amount of time, and may include a process 320 for eliminating processing window artifacts according to the disclosed embodiments. As shown in block 305, the value of L is tested to determine if $L=L_r$. If not, the recursive function continues to subdivide the image X into equal subsections $X_{sub}$ and call rhseg(L+1,$X_{sub}$) for each subsection as shown in block 310. As shown in block 315, after the calls to rhseg( ) are complete, the results are reassembled, and as shown in block 320, process window artifact elimination is implemented, as will be explained below.

Referring to block 325, the execution of HSeg may be stopped at $N_{min}$ regions in the recursive function. The default values for $N_{min}$ may be equal to $$\frac{1}{2^{N_D}}$$

the number of pixels in the subimage processed at the deepest level of recursion. For example, for sequential processing, $N_{min}$ may equal (64×56×48/8=) 21,504 regions, and for parallel processing, $N_{min}$ may equal (32×28×24/8=)

2688 regions. At the deepest level of recursion (i.e., $L=L_r$), HSeg may normally be initialized with each image pixel labeled as a separate region. However, at the other levels of recursion, HSeg may be initialized with the segmentation result from the previous step. Processing window artifact elimination 320 may be performed at all but the deepest level of recursion.

Figure 4:
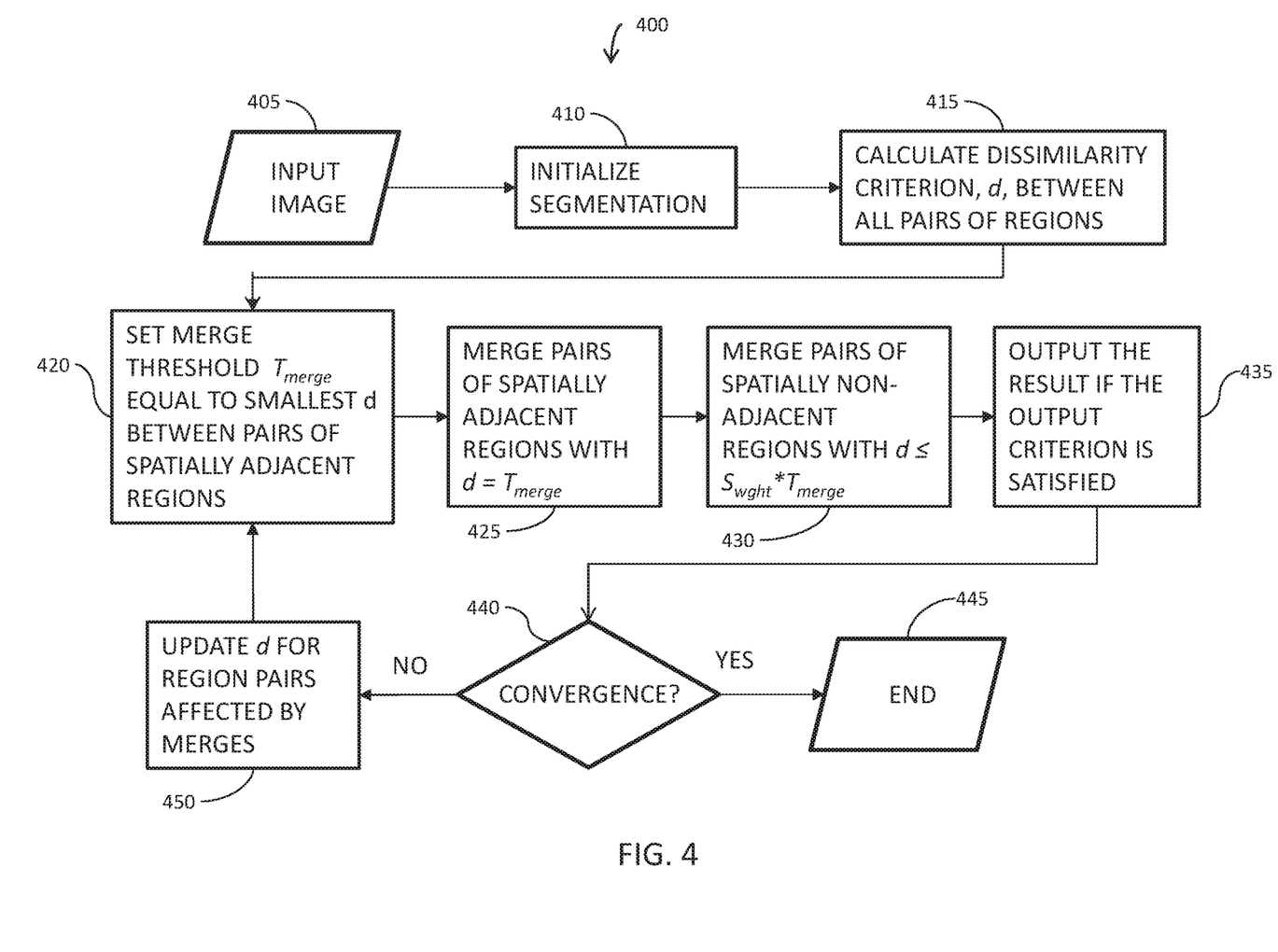
FIG. 4 illustrates a flow diagram of the operations of the HSeg algorithm, according to the disclosed embodiments.

FIG. 4 illustrates a flow diagram of the operations of the HSeg algorithm. The HSeg algorithm controls the merging of spatially adjacent regions and the merging of spatially non-adjacent regions according to the parameter $S_{wght}$, which can vary from 0.0 to 1.0. When $S_{wght}=0.0$, only merges between spatially adjacent regions are allowed (no spectral clustering). When $S_{wght}=1.0$, merges between spatially adjacent and spatially non-adjacent regions are given equal priority. For $0.0<S_{wght}<1.0$, spatially adjacent merges are given priority over spatially non-adjacent merges by a factor of $$\frac{1.0}{S_{wght}}.$$

Thus for $S_{wght}>0.0$, spatially connected region objects may be grouped or classified into spatially disjoint region classes.

The image is input to the algorithm, as shown in block 405, and the segmentation process is initialized as shown in block 410. Initialization includes assigning each image pixel a region label. If a presegmentation is provided, for example from the operations illustrated in FIG. 2 or 3, each image pixel may be labeled according to the presegmentation, otherwise, each image pixel may be labeled as a separate region.

As shown in block 415, a dissimilarity criterion value d may be calculated between all pairs of regions. If $S_{wght}=0.0$, the dissimilarity criterion only needs to be calculated between all pairs of spatially adjacent regions. A merge threshold $T_{merge}$ may be set equal to the smallest dissimilarity criterion value d between pairs of spatially adjacent regions, as shown in block 420, and according to block 425, pairs of spatially adjacent regions with $d=T_{merge}$ may be merged. Pairs of non-adjacent regions with $d \le S_{wght}*T_{merge}$ may be merged if $S_{wght}>0$, as shown in block 430, and as shown in block 235, if the output criterion is satisfied, discussed in more detail below, the segmentation result may be output.

The algorithm determines if convergence has been achieved in block 440, and if so, operations may end as shown in block 445. Convergence may be considered to be achieved when a specified number of regions have been reached (by default, for example, two regions). However, if convergence has not been achieved, the dissimilarity criterion values d may be updated for the regions affected by merges, as shown in block 450, and the algorithm operation may return to block 420.

Referring to the output criterion of block 435, since segmentation results with a large number of regions are usually severely oversegmented and thus not of interest, HSeg does not normally output the hierarchical segmentation results until the number of regions reaches a user specified value or a default specified by the program, for example, 255 regions. After that point, HSeg normally outputs a subsequent hierarchical segmentation result at the iteration just prior to the iteration at which any region would be involved in more than one merge since the last result was output. Alternatively, HSeg can be set to output hierarchical segmentation at a user specified list of number of regions or list of merge thresholds.

Referring to the dissimilarity criterion of block 415, one can select from a number of criteria for evaluating how dissimilar one region is from another in HSeg. These dissimilarity criteria include criterion based on vector norms, minimizing the mean square error difference or the change in entropy between the region mean image and the original image, among others.

As mentioned above, the rhseg( ) image subdivision 310 and reassembly 315 processes may be followed by a window artifact elimination process 320.

Figure 5:
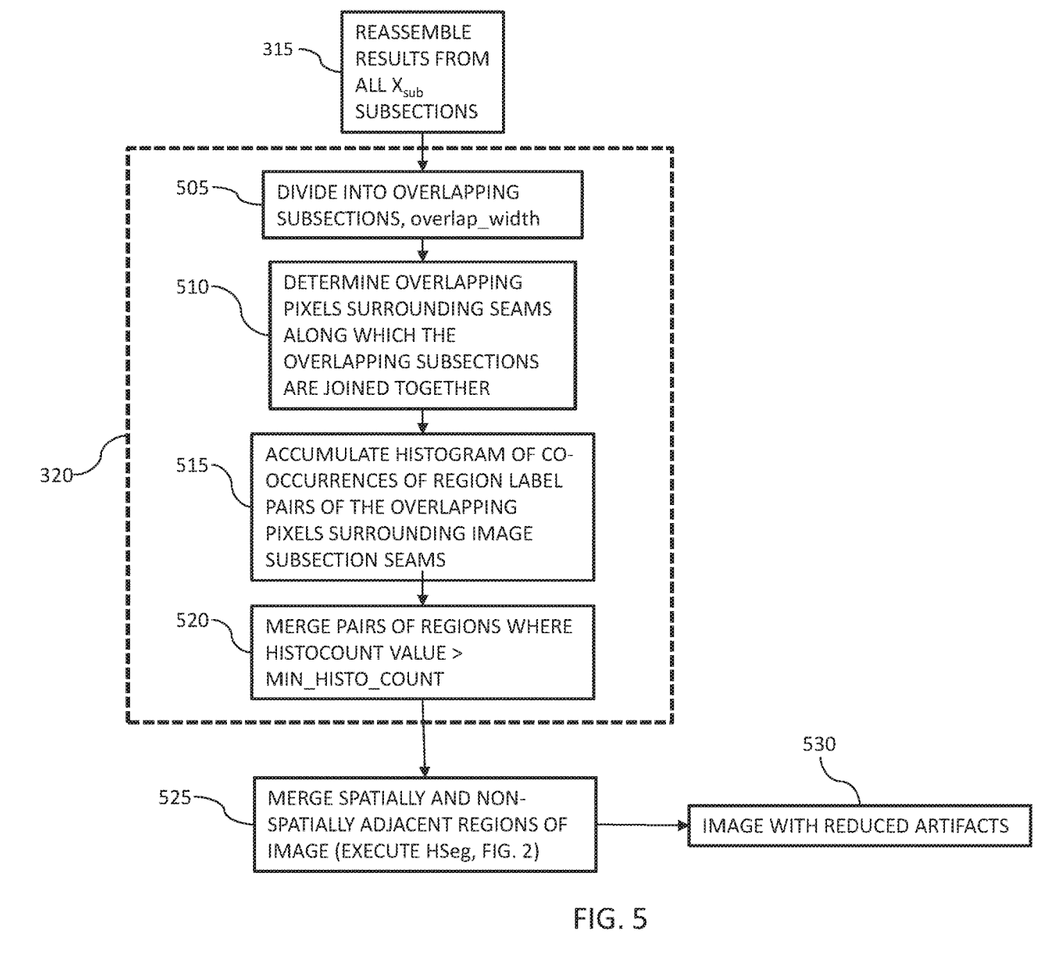
FIG. 5 illustrates at least one example of a window artifact elimination process according to the disclosed embodiments.

FIG. 5 illustrates at least one example of the window artifact elimination process 320. As shown in block 505, the image may be subdivided into overlapping sections controlled by the parameter overlap_width. For an exemplary default value of overlap_width=2, the example image may first be subdivided into eight subsections of 132 columns, 116 rows and 52 slices, and then may be further subdivided into eight subsections of 68 columns, 60 rows and 52 slices. Each image subsection may have an extra 2 pixels of overlapping rows and columns around the entire outer edge of the subsection (in some embodiments, a mask may be used to mask out the extra two rows and columns outside the actual physical extent of the image). For parallel processing, each subdivision may be further subdivided into eight subsections of 36 columns, 32 rows and 28 slices.

As mentioned above, HSeg may be executed until it reaches $N_{min}$ regions. As before, $N_{min}$ may be equal to $$\frac{1}{2^{N_D}}$$

the number or pixels in me subimage processed at the deepest level of recursion. With overlapping processing windows, $N_{min}$ may be equal to (68×60×52/8=) 26,520 regions for sequential processing, and $N_{min}$ may be equal to (36×32×28/8=) 4032 regions for parallel processing.

As shown in block 510, overlapping pixels surrounding the vertical and horizontal seams may be determined. The overlapping pixels may surround the seams, along which the overlapping subsections are joined together, in two dimensions. With an overlap_width=2, there may be an overlapping 4 pixel wide area of pixels along the vertical and horizontal seams along which the image subsections are joined together. for example, if the image has 256 columns and 224 rows, there may be an overlapping 4 pixel by 224 row seam of pixels surrounding the vertical seam and a 4 pixel by 256 column seam of pixels surrounding the horizontal seam at recursive level L=1.

In an exemplary 3D implementation, overlapping volumes of pixels surrounding the vertical, horizontal and depth seams may be determined. For the example case, at recursive level L=1, there may be an overlapping 4 pixel by 224 row by 192 slice volume surrounding the vertical seam, an overlapping 4 pixel by 192 slice by 256 column volume surrounding the horizontal seam and an overlapping 4 pixel by 256 column by 224 row volume surrounding the depth seam.

As shown in block 515, a histogram of co-occurrences of region label pairs of the pixels surrounding the seams along which the image subsections are joined together may be accumulated. A region from one subsection seam may be merged together with a region from another subsection seam if the histogram count value for both regions exceeds a specified minimum number of pixels (MIN_HISTO_COUNT), as shown in block 520. In some embodiments, the minimum number of pixels (MIN_HISTO_COUNT) may have a default value of 9.

As shown in block 525, the spatially and non-spatially adjacent regions of the image may be merged, for example by executing HSeg, as shown in block 225 of FIG. 2, resulting in an image with reduced artifacts, as shown in block 530.

Care should be taken in the approach for accumulating the histogram of region labeling correspondences. In the most naive approach, the histogram may be accumulated by declaring a two dimensional array of size nregions×nregions, where nregions is the number of regions in the image reassembled from the subsections, scanning the overlapped areas for region label correspondences, and incrementing the histogram array for each found correspondence. While this approach may work well for small images, this approach may lead to excessively large memory requirements for large images.

An alternative approach may be to create a histocount structure comprising two region indices and a count. In this approach, instances of histocounts may be created as new region label correspondences are found, and the count value of a previously created histocount may be incremented when previously encountered region label correspondences are found. An additional efficiency may be realized by noting that regions with MIN_HISTO_COUNT pixels or less cannot end up with a histogram value of greater than MIN_HISTO_COUNT and not creating histocount instances including such regions.

A side effect of the processing window overlapping may be that the pixels in the overlapping areas are counted twice in accumulating the feature values for each region. In some embodiments, the effect may be eliminated through a more complicated programming structure, however, it should be understood that RHSeg is an approximation to HSeg over the whole image, and this double counting should be considered to be another aspect of this approximation. Nonetheless, the double counting of image pixels in the overlapping areas may be eliminated at the final stage of RHSeg prior to when HSeg is run on the image as a whole (see block 225, FIG. 2). At this point in the execution of RHSeg, the processing window overlapping may be undone by discarding the data values in the overlapped areas in each image subsection, and the region features may be reinitialized based on the non-overlapping data subsections.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. A method comprising:
  receiving a recursively subdivided and reassembled first image comprising pixels, each pixel assigned a region label;
  subdividing the image into overlapping subsections;
  determining overlapping pixels surrounding seams along which the overlapping subsections are joined together;
  accumulating a histogram of co-occurrences of region label pairs of the overlapping pixels surrounding the seams along which the overlapping subsections are joined together;
  merging overlapping pixels having region labels with a co-occurrence histogram count exceeding a predetermined threshold; and
  merging spatially and non-spatially adjacent regions of the first image to form a second image with reduced artifacts proximate the seams along which the overlapping subsections are joined together.

2. The method of claim 1, wherein the overlapping pixels surround the seams, along which the overlapping subsections are joined together, in two dimensions.

3. The method of claim 2, wherein the overlapping pixels form a 4 pixel wide area of pixels along vertical and horizontal seams along which the image subsections are joined together.

4. The method of claim 1, wherein the overlapping pixels surround the seams, along which the overlapping subsections are joined together, in a three dimensional volume.

5. The method of claim 4, wherein the three dimensional volume is 4 pixels by a total number of rows and slices surrounding a vertical seam, 4 pixels by a total number of slices and columns surrounding a horizontal seam, and 4 pixels by a total number of columns and rows surrounding a depth seam, along which seams the image subsections are joined together.

6. The method of claim 1, wherein the predetermined threshold of the co-occurrence histogram count is 9.

7. The method of claim 1, further comprising eliminating double counted pixels before merging spatially and non-spatially adjacent regions of the first image.

8. A system comprising:
  a processor;
  a memory storing instructions for controlling the processor to:
  receive a recursively subdivided and reassembled first image comprising pixels, each pixel assigned a region label;
  subdivide the image into overlapping subsections;
  determine overlapping pixels surrounding seams along which the overlapping subsections are joined together;
  accumulate a histogram of co-occurrences of region label pairs of the overlapping pixels surrounding the seams along which the overlapping subsections are joined together; and
  merge overlapping pixels having region labels with a co-occurrence histogram count exceeding a predetermined threshold to form a second image with reduced artifacts proximate the seams along which the overlapping subsections are joined together.

9. The system of claim 8, wherein the overlapping pixels surround the seams, along which the overlapping subsections are joined together, in two dimensions.

10. The system of claim 9, wherein the overlapping pixels form a 4 pixel wide area of pixels along vertical and horizontal seams along which the image subsections are joined together.

11. The system of claim 8, wherein the overlapping pixels surround the seams, along which the overlapping subsections are joined together, in a three dimensional volume.

12. The system of claim 11, wherein the three dimensional volume is 4 pixels by a total number of rows and slices surrounding a vertical seam, 4 pixels by a total number of slices and columns surrounding a horizontal seam, and 4 pixels by a total number of columns and rows surrounding a depth seam, along which seams the image subsections are joined together.

13. The system of claim 8, wherein the predetermined threshold of the co-occurrence histogram count is 9.

14. The system of claim 8, wherein the memory stores instructions for controlling the processor to eliminate double counted pixels before merging spatially and non-spatially adjacent regions of the first image.

15. A non-transitory computer readable medium, storing computer executable program code, which when executed by at least one processor of a computer system, causes the computer system to:
receive a recursively subdivided and reassembled first image comprising pixels, each pixel assigned a region label;
subdivide the image into overlapping subsections;
determine overlapping pixels surrounding seams along which the overlapping subsections are joined together;
accumulate a histogram of co-occurrences of region label pairs of the overlapping pixels surrounding the seams along which the overlapping subsections are joined together; and
merge overlapping pixels having region labels with a co-occurrence histogram count exceeding a predetermined threshold to form a second image with reduced artifacts proximate the seams along which the overlapping subsections are joined together.

16. The non-transitory computer readable medium of claim 15, wherein the overlapping pixels surround the seams, along which the overlapping subsections are joined together, in two dimensions.

17. The non-transitory computer readable medium of claim 16, wherein the overlapping pixels form a 4 pixel wide area of pixels along vertical and horizontal seams along which the image subsections are joined together.

18. The non-transitory computer readable medium of claim 15, wherein the overlapping pixels surround the seams, along which the overlapping subsections are joined together, in a three dimensional volume.

19. The non-transitory computer readable medium of claim 18, wherein the three dimensional volume is 4 pixels by a total number of rows and slices surrounding a vertical seam, 4 pixels by a total number of slices and columns surrounding a horizontal seam, and 4 pixels by a total number of columns and rows surrounding a depth seam, along which seams the image subsections are joined together.

20. The non-transitory computer readable medium of claim 15, wherein the computer executable program code causes the computer system to eliminate double counted pixels before merging spatially and non-spatially adjacent regions of the first image.

* * * * *